(12) United States Patent
Benabdelaziz et al.

(10) Patent No.: US 10,298,143 B2
(45) Date of Patent: *May 21, 2019

(54) RECTIFYING CIRCUIT WITH THYRISTORS

(71) Applicant: STMICROELECTRONICS (TOURS) SAS, Tours (FR)

(72) Inventors: Ghafour Benabdelaziz, Tours (FR); Laurent Gonthier, Taipei (TW)

(73) Assignee: STMicroelectronics (Tours) SAS, Tours (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,854

(22) Filed: Jan. 23, 2018

(65) Prior Publication Data

US 2018/0152116 A1   May 31, 2018

Related U.S. Application Data

(63) Continuation of application No. 15/140,163, filed on Apr. 27, 2016, now Pat. No. 9,912,249.

(30) Foreign Application Priority Data

Dec. 15, 2015 (FR) ...................... 15 62393

(51) Int. Cl.
*H02M 1/08* (2006.01)
*H02M 1/32* (2007.01)
(Continued)

(52) U.S. Cl.
CPC ............... *H02M 7/06* (2013.01); *H02M 1/08* (2013.01); *H02M 1/32* (2013.01); *H02M 1/36* (2013.01); *H02M 1/42* (2013.01); *H02M 7/1623* (2013.01)

(58) Field of Classification Search
CPC ....................................................... H02M 7/06
See application file for complete search history.

(56) References Cited

U.S. PATENT DOCUMENTS 3,462,678 A   8/1969  Eaton
3,681,678 A   8/1972  Holmquest
(Continued)

FOREIGN PATENT DOCUMENTS

CN        86 1 04377 A    10/1987
CN        102202451 A      9/2011
(Continued)

*Primary Examiner* — Jue Zhang
*Assistant Examiner* — Trinh Q Dang
(74) *Attorney, Agent, or Firm* — Seed Intellectual Property Law Group LLP

(57) ABSTRACT

A rectifying circuit including: between a first terminal of application of an AC voltage and a first rectified voltage delivery terminal, at least one first diode; and between a second terminal of application of the AC voltage and a second rectified voltage delivery terminal, at least one first anode-gate thyristor, the anode of the first thyristor being connected to the second rectified voltage delivery terminal; and at least one first stage for controlling the first thyristor, including: a first transistor coupling the thyristor gate to a terminal of delivery of a potential which is negative with respect to the potential of the second rectified voltage delivery terminal; and a second transistor connecting a control terminal of the first transistor to a terminal for delivering a potential which is positive with respect to the potential of the second rectified voltage delivery terminal, the anode of the first thyristor being connected to the common potential of voltages defined by said positive and negative potentials.

20 Claims, 4 Drawing Sheets

(51) Int. Cl.
    *H02M 1/36*     (2007.01)
    *H02M 1/42*     (2007.01)
    *H02M 7/06*     (2006.01)
    *H02M 7/162*     (2006.01)

(56) References Cited

U.S. PATENT DOCUMENTS

| | | |
|---|---|---|
| 5,739,673 A | 4/1998 | Le Van Suu |
| 5,995,395 A | 11/1999 | Rivet |
| 6,493,245 B1 | 12/2002 | Phadke |
| 6,714,429 B2 | 3/2004 | Phadke |
| 8,593,842 B1 | 11/2013 | Sadwick et al. |
| 9,912,249 B2 * | 3/2018 | Benabdelaziz ......... H02M 7/06 |
| 2006/0082349 A1 | 4/2006 | Peron |

FOREIGN PATENT DOCUMENTS

| | | |
|---|---|---|
| CN | 104184339 A | 12/2014 |
| CN | 204089622 U | 1/2015 |
| FR | 2 742 013 A1 | 6/1997 |
| FR | 2 746 981 A1 | 10/1997 |

\* cited by examiner

RECTIFYING CIRCUIT WITH THYRISTORS

BACKGROUND

Technical Field

The present disclosure generally relates to electronic circuits and, more specifically, to the forming of a rectifying bridge based on diodes and thyristors.

Description of the Related Art

Many implementations of controllable rectifying bridges, based on the use of thyristors, are known.

For example, U.S. Pat. No. 6,493,245 describes a rectifying bridge having two cathode-gate thyristors provided in the upper portion of the bridge, that is, with the cathodes connected to the positive potential of the rectified voltage.

BRIEF SUMMARY

An embodiment overcomes all or part of the disadvantages of usual rectifying bridges with thyristors.

Another embodiment more specifically provides a controllable rectifying bridge having a simplified control.

Another embodiment provides a controllable rectifying bridge compatible with applications where the current of the load controlled by the bridge varies by significant proportions.

Thus, an embodiment provides a rectifying circuit comprising:

between a first terminal of application of an AC voltage and a first terminal of delivery of a rectified voltage, at least one first diode;

between a second terminal of application of the AC voltage and a second terminal of delivery of the rectified voltage, at least one first anode-gate thyristor, the anode of the first thyristor being connected to the second rectified voltage delivery terminal; and at least one first stage for controlling the first thyristor, comprising:

a first transistor coupling the gate of the thyristor to a terminal of delivery of a potential negative with respect to the potential of the second terminal of delivery of the rectified voltage; and a second transistor connecting a control terminal of the first transistor to a terminal of delivery of a potential which positive is with respect to the potential of the second rectified voltage delivery terminal, the anode of the first thyristor being connected to the common potential of voltages defined by said positive and negative potentials.

According to an embodiment, the circuit further comprises:

between the second terminal of application of the AC voltage and the first terminal of delivery of the rectified voltage, at least one second diode;

between the first terminal of application of the AC voltage and the second terminal of delivery of the rectified voltage, at least one second anode-gate thyristor, the anode of the second thyristor being connected to the second terminal of delivery of the rectified voltage; and at least one second stage for controlling the second thyristor, comprising:

a third transistor coupling the gate of the second thyristor to said terminal of delivery of said negative potential; and a fourth transistor connecting a control terminal of the third transistor to said terminal of delivery of said positive potential.

An embodiment provides a rectifying circuit comprising:

a first terminal and a second terminal, intended to receive an AC voltage;

a third terminal and a fourth terminal, intended to deliver a rectified voltage;

a rectifying bridge having input terminals respectively connected to the first and second terminals, and having output terminals respectively connected to the third terminal, and connected by a first anode-gate thyristor to the fourth terminal; and a stage for controlling the thyristor comprising:

a first transistor coupling the gate of the first thyristor to a terminal of delivery of a potential which is negative with respect to the potential of the second terminal of delivery of the rectified voltage; and a second transistor connecting a control terminal of the first transistor to a terminal of delivery of a potential which is positive with respect to the potential of the second rectified voltage delivery terminal, the anode of the first thyristor being connected to the common potential of voltages defined by said positive and negative potentials.

According to an embodiment, the second or the second and fourth transistors are controlled by a digital circuit.

According to an embodiment, a resistive element is interposed between the gate of the first or of each thyristor and the first transistor or each of the first and third transistors.

According to an embodiment, a resistive element is interposed between the base of the first or of each of the first and third transistors and the second or each of the second and fourth MOS transistors.

According to an embodiment, the first or the first and third transistors are bipolar transistors, preferably of NPN type.

According to an embodiment, the second or the second and fourth transistors are MOS transistors.

According to an embodiment, the control circuit is powered with a positive voltage delivered by a power supply circuit connected to the first rectified voltage delivery terminal, a capacitor connecting the power supply circuit to the second rectified voltage delivery terminal.

According to an embodiment, said negative potential is obtained, from the power supply circuit, by a charge pump circuit.

According to an embodiment, at least one diode series-connected with a resistive element connects the second terminal of delivery of the rectified voltage to one of the terminals of application of the AC voltage.

The foregoing and other features and advantages will be discussed in detail in the following non-limiting description of specific embodiments in connection with the accompanying drawings.

DETAILED DESCRIPTION

Figure 1:
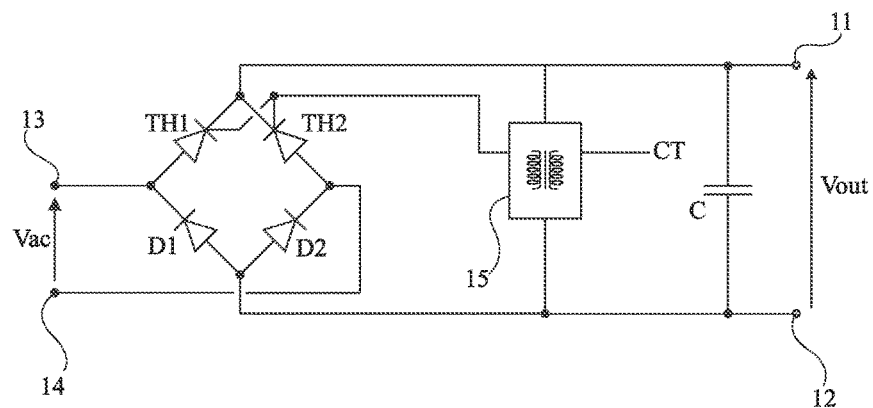
FIG. 1 is an electric diagram of an example of a known rectifying bridge with thyristors.

The same elements have been designated with the same reference numerals in the different drawings. For clarity, only those steps and elements which are useful to the understanding of the described embodiments have been shown and will be detailed. In particular, what use is made of the rectified voltage has not been detailed, the described embodiments being compatible with usual applications of such a rectified voltage. Further, the circuits for generating control signals from a microcontroller have not been detailed either, the described embodiments being here again compatible with usual control signal generation circuits. For simplification, in the following explanations, forward voltage drops will be neglected in the diodes and the thyristors.

FIG. 1 is an electric diagram of an example of a controllable rectifying bridge with thyristors of the type described in above-mentioned document U.S. Pat. No. 6,493,245. This bridge is a fullwave bridge and comprises two parallel branches between two terminals 11 and 12 of delivery of a rectified voltage Vout. Each branch comprises a thyristor Th1, respectively Th2, connected to a diode D1, respectively D2, the diode anodes being on the side of terminal 12 which defines the most negative potential (generally the ground or reference potential) of rectified voltage Vout. The respective junction points of the thyristors and of the diodes define two terminals 13 and 14 of application of an AC voltage Vac to be rectified. A capacitive element C is generally connected between terminals 11 and 12 to smooth the rectified voltage.

Thyristors Th1 and Th2 are cathode-gate thyristors intended to be controlled from a signal CT.

In such a controllable rectifying bridge, a control voltage directly originating from a microcontroller cannot be applied, neither can, more generally, a voltage directly referenced to reference potential 12, due to the reference of the cathodes of thyristors Th1 and Th2, which is on the side of the most positive potential (terminal 11) of the rectified voltage. This imposes using a conversion element 15 of galvanic isolation transformer or optocoupler type to convert the reference of the control signal.

Such an embodiment increases the production costs of a controllable rectifying bridge.

Figure 2:
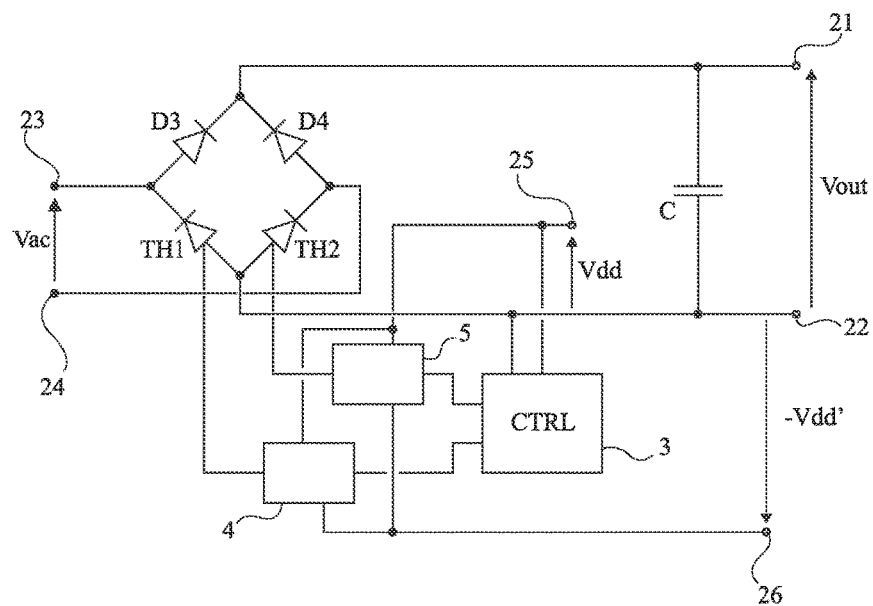
FIG. 2 is a block diagram of an embodiment of a controllable rectifying circuit with thyristors.

FIG. 2 schematically shows in the form of blocks an embodiment of a controllable rectifying circuit (rectifying bridge with thyristors). This circuit comprises a rectifying bridge having two parallel branches between two terminals 21 and 22 of delivery of a rectified voltage Vout, terminal 22 representing a reference potential, such as ground GND. Each branch comprises a diode D3, respectively D4, connected to a thyristor TH3, respectively TH4, between terminals 21 and 22, the thyristors having anodes connected to terminal 22 and the diode cathodes being connected to terminal 21. The respective midpoints of the two branches define terminals 23 and 24 of application of an AC voltage Vac to be rectified, terminal 23 being connected to the anode of diode D3 and to the cathode of thyristor TH3, terminal 24 being connected to the anode of diode D4 and to the cathode of thyristor TH4. A filtering capacitive element C is preferably connected between terminals 21 and 22.

Thyristors TH3 and TH4 are anode-gate thyristors. The respective gates of thyristors TH3 and TH4 receive control signals from a control circuit 3 of digital control circuit or microcontroller type (CTRL), via control stages 4 and 5. Control circuit 3 is for example a microcontroller or an integrated circuit powered from a low positive voltage (for example, having a value in the range from 3.3 volts to 12 volts). Low positive voltage Vdd is provided between a terminal 25 at a positive potential Vdd and terminal 22. Voltage Vdd is low as compared with voltage Vout (in the range from some ten volts to several hundreds of volts).

For a current to flow in one of thyristors TH3 and TH4, the anode voltage should be greater than the cathode voltage and it should be activated by the drawing of a current onto its gate. Since the anodes of thyristors TH3 and TH4 are connected to terminal 22, to draw a current onto their respective gates, the latter have to be taken to a negative potential with respect to ground. To be able to directly process (with no optocoupler or the like) the control signals received from control circuit 3, control stages 4 and 5 are powered from positive potential Vdd (terminal 25). However, to be able to take the gates to a negative potential, the reference (low potential) of control stages 4 and 5, instead of being the ground, is a negative potential −Vdd' provided on a terminal 26. The absolute values of potential Vdd and −Vdd' may be identical or different according to the positive and negative voltages adapted to the application and to the components and circuits used.

Figure 3:
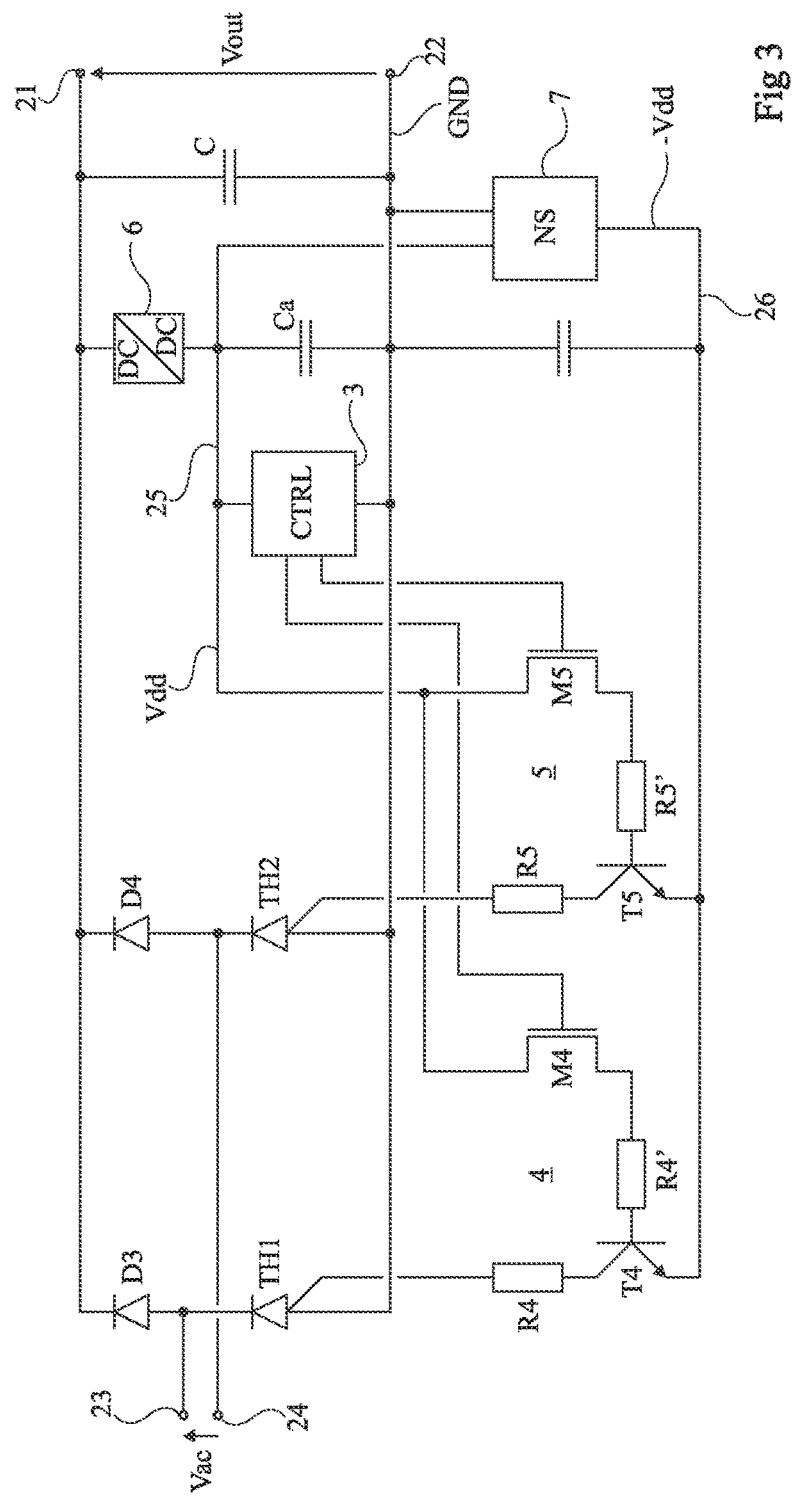
FIG. 3 is an electric diagram of an embodiment of the circuit of FIG. 2.

FIG. 3 is an electric diagram of an embodiment of the circuit of FIG. 2. FIG. 3 details, in particular, examples of the forming of control stages 4 and 5 and of generation of positive voltage Vdd.

Each control stage 4, 5 comprises a resistor, respectively R4, R5, in series with a bipolar transistor T4, T5, of type NPN, between the gate of thyristor TH3, respectively TH4, and terminal 26 at potential −Vdd, the emitter terminals of transistors T4 and T5 being connected to terminal 26. The base of transistor T4, respectively T5, is connected via a MOS transistor M4, respectively M5, series-connected with a resistor R4', respectively R5', to terminal 25 at potential Vdd. Transistor M4, respectively M5, is on the side of terminal 25. The gates of transistors M4 and M5 are connected to outputs of control circuit 3 providing DC control signals. Control circuit or microcontroller 3 may, on the other hand, receive information from other circuits, not shown.

The gates of transistors M4 and M5 are, in the quiescent state, at potential Vdd. Thus, transistors M4 and M5 are off, as well as transistors T4 and T5. Thyristors TH3 and TH4 are then off and the rectifying bridge is off.

To turn on one of thyristors TH3 or TH4, circuit 3 takes its output connected to the gate of the corresponding transistor M4 or M5 to ground. Thus, transistor M4, respectively M5, turns on. A base current is then injected into the base of transistor T4, respectively T5, which turns it on. A gate current is then drawn onto the gate of the concerned thyristor TH3 or TH4 and the corresponding branch of the bridge is thus on.

In practice, thyristor TH4 is turned on during positive halfwaves of input voltage Vac and thyristor TH3 is turned on during negative halfwaves.

Resistors R4', R5', R4, and R5 enable to set the current in the respective bases of transistors T4 and T5 and in the respective gates of thyristors TH3 and TH4.

As a variation, MOS transistors M4 and M5 are replaced with bipolar transistors, for example, if control circuit 3 can provide a current control. Similarly, bipolar transistors T4 and T5 may be replaced with MOS transistors.

Positive voltage Vdd may originate from an external power supply source but is, preferably, generated by a power supply circuit 6 (DC/DC) from voltage Vout. A capacitive element Ca is connected between power supply circuit 6 and terminal 22. Power supply circuit 6 is of voltage regulator type to provide a power supply voltage adapted to control circuit 3.

Preferably, negative voltage −Vdd' is obtained, indirectly from voltage Vout, by a circuit 7 (NS) generating, from voltage Vdd, voltage −Vdd'.

Figure 4:
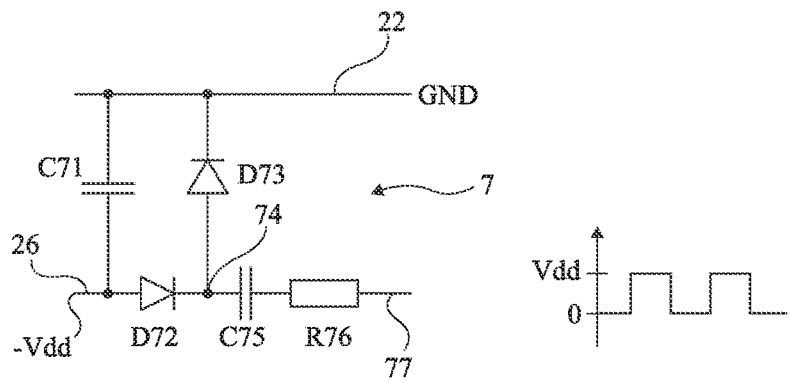
FIG. 4 illustrates an example of a circuit for generating a negative voltage for the rectifying bridge of FIGS. 2 and 3.

FIG. 4 shows an example of a circuit 7 for generating a negative voltage −Vdd'.

In this example, circuit 7 has the shape of a capacitive charge pump and comprises, between terminals 26 and 22, a first capacitor C71 and, in parallel, two series-connected diodes D72 and D73, the anode of diode D72 being coupled to terminal 26. Junction point 74 of diodes D72 and D73 (anode of diode D73 and cathode of diode D72) is connected, by a second capacitor C75 in series with a resistor R76, to a terminal 77 of application of a train of pulses at potential Vdd. Terminal 77 is for example connected to an output terminal of digital control circuit 3. The operation of a charge pump circuit such as illustrated in FIG. 4 is usual per se.

Other structures of generation of a negative power supply voltage may be provided, for example with a plurality of capacitive stages.

An advantage of the described embodiments is, as compared with the circuit of FIG. 1, that it is no longer necessary to use a conversion element of optocoupler or galvanic insulation transformer type to apply the control signals to the thyristors. This considerably simplifies the forming of a controllable rectifying bridge and decreases the cost thereof.

In an embodiment where voltages Vdd and −Vdd' are provided by external circuits, the control signals may be provided by control circuit 3, even with an initially-discharged capacitor C.

In the embodiment of FIG. 3 where voltages Vdd and −Vdd' are obtained from voltage Vout, a starting aid should be provided.

Figure 5:
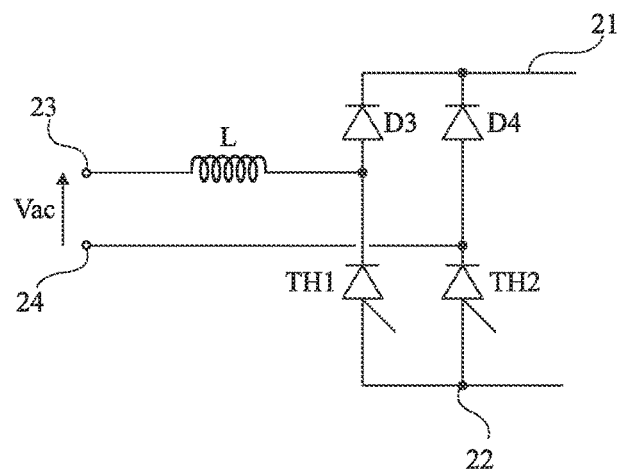
FIG. 5 illustrates a starting circuit for the controllably rectifying circuit shown in FIGS. 2 and 3.

FIG. 5 partially illustrates an embodiment of a starting circuit.

According to this example, an inductive element L is provided between one of terminals 23 and 24 (in FIG. 5, terminal 23) and the input of the bridge (e.g., the mid-point between diode D3 and thyristor TH3 and/or the mid-point between diode D4 and thyristor TH4) having this terminal connected thereto. The effect of this inductance is to slow down the growth of the current sampled from terminals 23 and 24 when thyristors TH3 and TH4 are turned on while capacitor C is not charged or is only very lightly charged.

Additionally or alternatively, an inductive element (not shown) may be placed at the output, between, for example, terminal 21 and the common point of the two anodes of thyristors TH3 and TH4. This inductive element may be placed upstream or downstream of capacitor C. This type of element may be used, for example, in a switched power supply circuit used to correct the power factor of the current sampled from the network.

Figure 6:
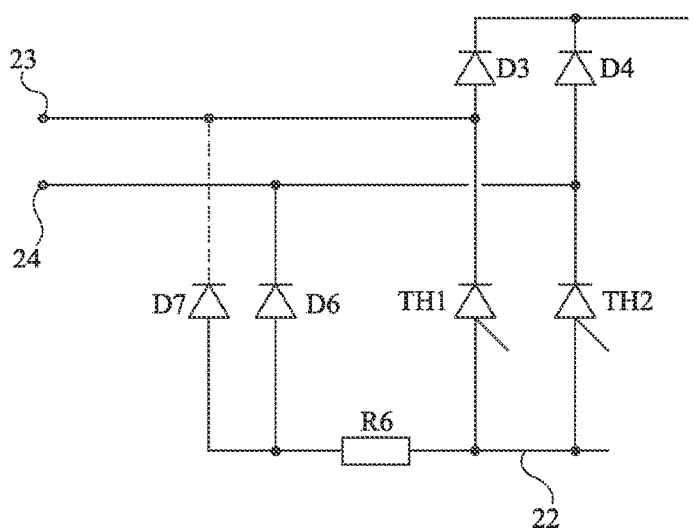
FIG. 6 is an electric diagram illustrating an alternative embodiment of a starting circuit.

FIG. 6 partially illustrates a variation of a starting circuit.

According to this example, a diode D6 connects one of the input terminals (for example, terminal 24) to ground 22 via a resistor R6. Another diode D7 may connect the other input terminal (for example, 23) to resistor R6 to start in fullwave mode. The effect of this resistor (which generally has a temperature variation coefficient) is to enable capacitor C to charge on powering-on, while control circuit 3 is not powered yet and thus cannot control thyristors TH3 and TH4, which are thus in the off state (otherwise preventing any charge of C). Such an embodiment enables to power control circuit 3 while avoiding an inductive element at the bridge input.

Figure 7:
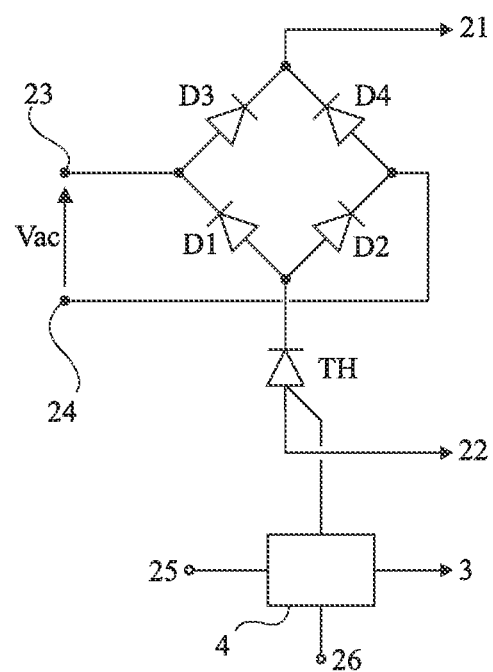
FIG. 7 is a block diagram illustrating a controllable rectifying circuit utilizing diodes.

FIG. 7 partially illustrates another embodiment where the rectifying bridge is a fullwave bridge only formed of diodes D1, D2, D3, and D4. This amounts to replacing thyristors TH3 and TH4 with diodes D1 and D2. The bridge is then controlled by a single anode-gate thyristor TH connected between the common anodes of diodes D1 and D2 and terminal 22. Thyristor TH is controlled by a control stage circuit 4.

Various embodiments have been described. Various alterations, modifications, and improvements will occur to those skilled in the art. In particular, although the embodiments have been described in relation with an example of a fullwave rectifying bridge, a halfwave bridge may be provided by using a single thyristor. A multiphase network with as many thyristor-diode arms as there are phases (for example, three thyristors and three diodes for a three-phase network) may also be provided. Further, the generation of the control signals capable of controlling the rectifying bridge depends on the application and is within the abilities of those skilled in the art according to this application. Further, the practical implementation of the embodiments which have been described is within the abilities of those skilled in the art based on the functional indications which have been described hereabove.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rectifying circuit, comprising:
   first and second input terminals;
   first and second output terminals;
   an inductor coupled to one of the first and second input terminals;
   a first diode coupled between the first input terminal and the first output terminal;
   a first thyristor having a cathode coupled to the first input terminal and an anode coupled to the second output terminal; and
   a first control stage that, in operation, controls the first thyristor, the first control stage being coupled between a first voltage that is positive with respect to a voltage at the second output terminal and a second voltage that is negative with respect to the voltage at the second output terminal.

2. The circuit of claim 1 wherein the first control stage includes:
   a first transistor coupled between a gate of the first thyristor and the second voltage; and
   a second transistor coupled between a gate of the first transistor and the first voltage.

3. The circuit of claim 1 wherein the inductor is connected between the first input terminal and a first intermediate node, the first diode is connected between the first intermediate node and the first output terminal, and the first thyristor is connected between the first intermediate node and the second output terminal.

4. The circuit of claim 1, further comprising:
a power supply circuit that, in operation, generates the first voltage, the power supply circuit having an input coupled to the first output terminal and an output that outputs the first voltage; and
a capacitor coupled between the output of the power supply circuit and the second output terminal.

5. The circuit of claim 2, further comprising:
a second diode coupled between the second input terminal and the first output terminal;
a second thyristor having a cathode coupled to the second input terminal and an anode coupled to the second output terminal; and
a second control stage that, in operation, controls the second thyristor, the second control stage being coupled between the first voltage and the second voltage.

6. The circuit of claim 4, further comprising:
a charge pump circuit that, in operation, generates and outputs the second voltage.

7. The circuit of claim 5 wherein the inductor is connected between the second input terminal and a first intermediate node, the second diode is connected between the first intermediate node and the first output terminal, and the second thyristor is connected between the first intermediate node and the second output terminal.

8. The circuit of claim 5 wherein the second control stage includes:
a third transistor coupled between a gate of the second thyristor and the second voltage; and
a fourth transistor coupled between a gate of the third transistor and the first voltage.

9. The circuit of claim 8, further comprising a digital control circuit that, in operation, controls at least one of the second and fourth transistors.

10. The circuit of claim 8, further comprising:
a first resistor coupled between the gate of the first thyristor and the first transistor; and
a second resistor coupled between the gate of the second thyristor and the third transistor.

11. The circuit of claim 8, further comprising:
a first resistor coupled between the gate of the first transistor and the second transistor; and
a second resistor coupled between the gate of the third transistor and the fourth transistor.

12. A circuit, comprising:
a rectifying bridge including:
first and second input terminals;
first and second output terminals; and
first and second thyristors, each of the first and second thyristors being coupled between a respective one of the first and second input terminals and the second output terminal;
an inductor coupled to one of the first and second input terminals of the rectifying bridge;
a first control stage configured to control the first thyristor, the first control stage being coupled between a first voltage terminal that supplies a first voltage that is positive with respect to a voltage at the second output terminal and a second voltage terminal that supplies a second voltage that is negative with respect to the voltage at the second output terminal; and a second control stage configured to control the second thyristor, the second control stage being coupled between the first voltage terminal and the second voltage terminal.

13. The circuit of claim 12 wherein the first control stage includes:
a first transistor coupled between a gate of the first thyristor and the second voltage terminal; and
a second transistor coupled between a gate of the first transistor and the first voltage terminal.

14. The circuit of claim 12 wherein the rectifying bridge further includes:
a first diode coupled between the first input terminal and the first output terminal of the rectifying bridge; and
a second diode coupled between the second input terminal and the first output terminal of the rectifying bridge.

15. The circuit of claim 12, further comprising:
a power supply circuit having an input coupled to the first output terminal of the rectifying bridge, the power supply circuit configured to generate the first voltage and output the first voltage to the first voltage terminal; and
a capacitor coupled between the first voltage terminal and the second output terminal.

16. The circuit of claim 13 wherein the second control stage includes:
a third transistor coupled between a gate of the second thyristor and the second voltage terminal; and
a fourth transistor coupled between a gate of the third transistor and the first voltage terminal.

17. The circuit of claim 16, further comprising a digital control circuit configured to control the second transistor and the fourth transistor.

18. A method, comprising:
coupling an inductor to one of a first input terminal and a second input terminal of a rectifying circuit;
coupling a first diode between the first input terminal and the first output terminal;
coupling a cathode of a first thyristor to the first input terminal;
coupling an anode of the first thyristor to the second output terminal;
coupling a gate of the first thyristor to a negative potential supply terminal via a first transistor; and
coupling a gate of the first transistor to a positive potential supply terminal via a second transistor.

19. The method of claim 18, further comprising:
connecting the inductor between the first input terminal and a first intermediate node;
connecting the first diode between the first intermediate node and the first output terminal; and
connecting the first thyristor between the first intermediate node and the second output terminal.

20. The method of claim 18, further comprising:
coupling a second diode between the second input terminal and the first output terminal;
coupling a cathode of a second thyristor to the second input terminal;
coupling an anode of the second thyristor to the second output terminal;
coupling a gate of the second thyristor to the negative potential supply terminal via a third transistor; and
coupling a gate of the third transistor to the positive potential supply terminal via a fourth transistor.

* * * * *